United States Patent
De Groot et al.

(10) Patent No.: US 11,682,498 B2
(45) Date of Patent: Jun. 20, 2023

(54) METHOD FOR PRODUCING ACTINIUM-225 FROM A RADIUM-226 TARGET BY SHIELDING THE TARGET FROM THERMAL NEUTRONS IN A MODERATED NUCLEAR REACTOR

(71) Applicant: NUCLEAR RESEARCH AND CONSULTANCY GROUP, Petten (NL)

(72) Inventors: Sander De Groot, Petten (NL); Klaas Bakker, Petten (NL); Nicola Asquith, Petten (NL)

(73) Assignee: NUCLEAR RESEARCH AND CONSULTANCY GROUP, Petten (NL)

(*) Notice: Subject to any disclaimer, the term of this patent is extended or adjusted under 35 U.S.C. 154(b) by 0 days.

(21) Appl. No.: 17/555,131

(22) Filed: Dec. 17, 2021

(65) Prior Publication Data
US 2022/0108812 A1    Apr. 7, 2022

Related U.S. Application Data

(63) Continuation of application No. PCT/EP2020/067352, filed on Jun. 22, 2020.

(30) Foreign Application Priority Data

Jun. 21, 2019 (EP) .................................... 19181711

(51) Int. Cl.
*G21G 1/02* (2006.01)
*G21G 1/00* (2006.01)
(Continued)

(52) U.S. Cl.
CPC ............. *G21G 1/02* (2013.01); *G21C 11/028* (2013.01); *G21G 1/001* (2013.01); *G21C 11/022* (2013.01);
(Continued)

(58) Field of Classification Search
CPC .... G21G 1/02; G21G 2001/0089; G21G 1/06; G21C 11/028; G21C 11/022
(Continued)

(56) References Cited

U.S. PATENT DOCUMENTS

| 3,269,915 | A | 8/1966 | Ransohoff et al. |
| 2007/0076834 | A1* | 4/2007 | Bermudez .......... A61K 51/1282 376/194 |

(Continued)

FOREIGN PATENT DOCUMENTS

| EP | 0 752 710 | 1/1997 |
| WO | WO-2020210147 A1 * | 10/2020 ............. G21G 1/001 |

OTHER PUBLICATIONS

Melville, "A theoretical model for the production of Ac-225 for cancer therapy by neutron capture transmutation of Ra-226", Applied Radiation and Isotopes 72 (2013): 152-157. (Year: 2013).*
(Continued)

*Primary Examiner* — Jack W Keith
*Assistant Examiner* — Daniel Wasil
(74) *Attorney, Agent, or Firm* — Sunit Talapatra; Foley & Lardner LLP

(57) ABSTRACT

A method for the manufacture of Actinium-225 from a Radium-226 containing material. Radium-226 containing starting target material is shielded with a thermal neutron absorption shield and is subjected to neutron irradiation from a moderated nuclear reactor. Radium-226 is thereby converted into Radium-225 to provide a Radium-225-containing material. The Radium-225 in the Radium-225 containing material is allowed to decay into Actinium-225, and the Actinium-225 is isolated from the Radium-225 containing material. The neutron absorption shield shields the starting target material from neutrons having an energy in the range of 20 eV to 1000 eV.

14 Claims, 1 Drawing Sheet

(51) Int. Cl.
*G21C 11/02* (2006.01)
*G21C 11/08* (2006.01)
*G21G 1/06* (2006.01)

(52) U.S. Cl.
CPC .............. *G21C 11/08* (2013.01); *G21G 1/06* (2013.01); *G21G 2001/0089* (2013.01); *G21G 2001/0094* (2013.01)

(58) Field of Classification Search
USPC ........................................ 376/158, 170, 189
See application file for complete search history.

(56) References Cited

U.S. PATENT DOCUMENTS

2007/0092051 A1* 4/2007 Adelman ................ G21G 1/06
376/158
2014/0226774 A1 8/2014 Holden

OTHER PUBLICATIONS

Colameco, "Improved reflector modeling for light water reactor analysis" (2010). (Year: 2010).*
Nag, "Use of gadolinium as neutron poison in 540 MWe PHWR", India, 2006. (Year: 2006).*
International Search Report and Written Opinion issued for PCT/EP/2020-067352 and dated Sep. 23, 2020.

* cited by examiner

METHOD FOR PRODUCING ACTINIUM-225 FROM A RADIUM-226 TARGET BY SHIELDING THE TARGET FROM THERMAL NEUTRONS IN A MODERATED NUCLEAR REACTOR

CROSS-REFERENCE TO RELATED APPLICATIONS

This application is a continuation application of International Patent Application No. PCT/EP2020/067352, filed Jun. 22, 2020, which claims priority to EP Application No. 19181711.3, filed Jun. 21, 2019. The contents of these applications are herein incorporated by reference in their entireties.

FIELD OF THE INVENTION

The present invention relates to a method for the production of Actinium-225 ($^{225}$Ac) isotope from Radium-226 ($^{226}$Ra). More in particular, the invention relates to a method for the production of Radium-225($^{225}$Ra) and its subsequent conversion to Actinium-225 by decay.

BACKGROUND OF THE INVENTION

Actinium-225 ($^{225}$Ac) is an alpha-emitting isotope with a half-life of approximately 10 days, which is demonstrating great perspective for medical application. The application of $^{225}$Ac is especially foreseen in Targeted Alpha Therapy (TAT). In Targeted Alpha Therapy (TAT) the isotope can be attached to a variety of biomolecules or targeting compounds. The variety of biomolecules or targeting compounds bind specifically to for example cancer cells. The alpha decay of the isotope targeted to the cell destroys the cancer cell by alpha-decay. In case the targeting agent is specific enough, this application could provide an opportunity for treatment in which the malignant cells are locally treated and destroyed effectively. By using localized and targeted treatment negative side effects can be minimized. This compares advantageously to more common treatments, like chemotherapy or hormone therapy, in which the whole patient is affected by treatment, and side-effects can be severe. The developments of Targeted Alpha Therapy (TAT) are now rapidly evolving. The rapid developments create an increased need for alpha-emitting isotopes such as $^{225}$Ac, of a proper quality and quantity to be used in TAT.

Additionally, one of the daughter isotopes of $^{225}$AC is $^{213}$Bi (Bismuth-213). $^{213}$Bi has a 45 minute half-life and can also be adopted for alpha-emitter based therapies. The $^{213}$Bi isotope is also indirectly produced when $^{225}$AC is produced.

High purity $^{225}$AC is difficult to produce. Thus far only a few small $^{229}$Th (Thorium-229) sources are available. $^{229}$Th generates $^{225}$AC, by decay via $^{225}$Ra. However, since there are only low quantities of $^{229}$Th available, these routes can only support small scale applications. Creating $^{229}$Th sources for $^{225}$Ac-production can be achieved by $^{226}$Ra irradiation in a thermal spectrum by multiple neutron captures. Unfortunately this route also generates less desirable isotopes such as $^{228}$Th, which generates a high energy gamma flux. A high energy gamma flux such as from $^{228}$Th, causes difficulties with handling and radiation protection for a period of 10-20 years.

Another way to produce $^{225}$AC is by generating $^{225}$Ra directly from a $^{226}$Ra (n,2n) reaction, induced by high energy (fast) neutrons.

There are several publications that describe processes for the conversion of $^{226}$Ra to $^{225}$Ra and further to $^{225}$AC.

EP0752710 describes the conversion of Radium-226 to Actinium-225 in a fast spectrum nuclear reactor using high energy neutron in a (n, 2n)-reaction and focuses on chemically separating the desired isotope after decay of the unwanted Radium-227 isotope followed by the isolation of Actinium-225.

US20140226774 described the conversion of $^{226}$Ra to $^{227}$AC using thermal shielding to protect the $^{227}$AC from thermal neutrons and shape the spectrum such that the $^{226}$Ra nuclei are exposed to neutrons in the higher epithermal groups with an energy between 20 eV and 1 KeV.

US20070092051 describes an approach to generate Actinium-225 by irradiation of $^{226}$Ra with neutrons in a Fast Neutron Reactor (FNR) having a substantial flux of fast neutrons. Fast neutrons have a neutron energy of about 0.1-5 MeV to about 20 MeV. Irradiation of Radium-226 with neutrons having a neutron energy of about 0.1 MeV, preferably 5 MeV to about 20 MeV will yield $^{225}$Ra. By natural decay of $^{225}$Ra by emission of a beta particle, it is converted into $^{225}$Ac. Based on theoretical calculations, the potential yield in US20070092051 is estimated as 5 mCi (0.185 GBq) of Radium-225 per gram of Radium-226.

So it is already possible to generate $^{225}$AC via the $^{225}$Ra (n,2n) route. However, in view of the increasing interest, there is a relevance for more efficient, more convenient and more productive routes of generating $^{225}$Ra and from there $^{225}$AC.

The disadvantage of existing routes based on FNR's such as described in US20070092051 is that FNR's are not readily available and difficult to operate in a commercially sound manner. Worldwide, there are about 20 FNR's available. These are not generally in use or useable for the production of medical isotopes. It is generally complicated to introduce and retrieve targets in such FNRs, and these systems have limited flexibility and operational days, for convenient production of $^{225}$Ra.

SUMMARY OF THE INVENTION

The present inventors have set out to improve this method and in particular to allow for the production of the desired Radium-225 and Actinium-225 isotope from Radium-226 in a more efficient way, with a higher yield and selectivity and making use of nuclear infrastructure that is more readily available and more suitable for production purposes.

DETAILED DESCRIPTION OF THE INVENTION

Figure 1:
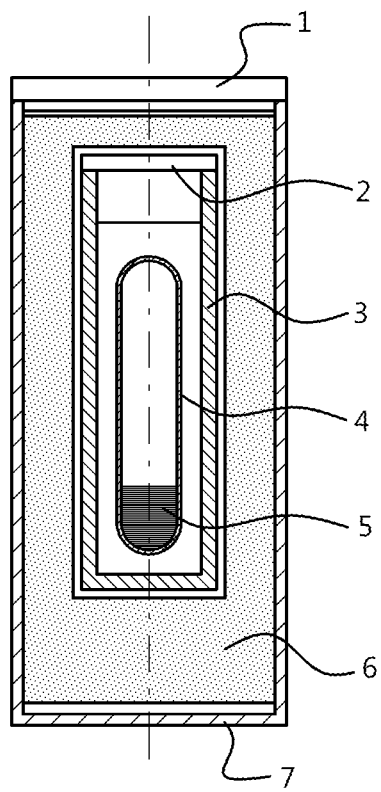
FIG. 1 discloses a schematic representation of an example of a containment cylinder that holds the thermal neutron shielded radium target material.

The inventors have found that instead of inside a FNR, Radium-225 and Actinium-225 can be produced in high yield and selectivity when a 'normal' moderated material test reactor is used.

A moderated material test reactor is generating a neutron flux that contains fast neutrons (having an energy in the MeV spectrum) and (epi-) thermal neutrons (having an energy in the <KeV spectrum). The presence of thermal neutrons in the neutron spectrum of a moderated material test reactor present problems in the efficient generation of $^{225}$AC since the thermal neutrons are capable of generating a variety of other isotopes in varying amounts (i.e. generates low selectivity towards the desired $^{225}$Ra, thus complicating workup of the desired isotope products and burn-up of the $^{225}$Ra starting material i.e. lowering yield of the desired $^{225}$Ra).

From initial experimentation with the High Flux Reactor Petten (HFR), the $^{225}$Ra generation rate by $^{226}$Ra (n,2n) is found to be higher than hitherto known. This offers the opportunity to produce $^{225}$Ra, as a source of $^{225}$AC, using the fast neutron part of the neutron flux in a 'normal' material test reactor such as the HFR. Common moderated material test reactors such as the HFR, generally have a lower fast neutron flux than most FNR's, but the post-irradiation experiments of $^{226}$Ra irradiated in the HFR show that the fast flux in a material test reactor is sufficient to produce significant amounts of $^{225}$Ac.

The present inventors realised that an efficient way of making $^{225}$Ac from $^{226}$Ra was when only the fast neutron part of the neutron flux was used and the thermal neutron activation was (substantially) eliminated. The inventors realised that this could be achieved by using a thermal neutron absorption shield around and preferably the Radium-226 target.

The shield absorbs (a large portion of) the thermal neutrons and allows the larger part of the fast neutrons to pass and interact with the target material ($^{226}$Ra).

The thermal shield is preferably formed such that the spectrum is shaped such that only or substantially neutrons that have the desired energy to convert $^{226}$Ra to $^{225}$Ra are not absorbed and interact with the target material. The preferred neutron energy window for the conversion of $^{226}$Ra to $^{225}$Ra lies in the range of from 0.1 MeV, preferably 5 MeV to 20 MeV.

The invention thus relates to the manufacture of Radium-225 containing material from Radium-226 containing materials by subjecting a starting material containing Radium-226 to neutron irradiation from (inside or near) a moderated material test nuclear reactor to convert Radium-226 into Radium-225 to provide a Radium-225 containing material, characterised in that
    the neutron irradiation of Radium-226-containing starting material is performed in a moderated nuclear reactor; and
    the Radium-226 containing starting material is shielded with a thermal neutron absorption shield.

It was found that the use of thermal neutron absorption shield during the irradiation of Radium-226 offers the following benefits:
    reduction of the amount and variety of highly radioactive isotopes generated by thermal neutron activation of Radium-226. Some of the highly radioactive isotopes produce high energy gamma radiation which is difficult to shield and complicate handling and processing after irradiation. The thermal neutron shield effectively reduces the formation of these particular isotopes and thereby facilitates greatly the feasibility of handling, processing and purification of the target material after irradiation.
    reduction of the amount and variety of isotopes generated by thermal neutron activation of Radium-226. This reduces the generation of unwanted isotopes by thermal neutron activation that may end up in the final product (improved product quality) and reduces the waste stream and complexity of the separation process (improved process quality. This specifically applies for example to $^{227}$AC, which is a very long lived isotope, that should be eliminated from the final product as much as possible, but cannot be chemically separated from the desired isotope $^{225}$AC.
    The burn-up of $^{226}$Ra by thermal neutron activation is reduced, hence reducing the amounts of $^{226}$Ra required for production. $^{226}$Ra is scarce.
    The burn-up of $^{225}$Ra by thermal neutron absorption ('back-activation' of $^{225}$Ra to $^{226}$Ra) is reduced, hence optimizing the $^{225}$Ra production.
    Increasing the production of $^{225}$Ra per weight unit (gr) of $^{226}$Ra.
    Increasing the yield of $^{225}$Ac per weight unit (gr) of $^{226}$Ra.
    reducing the amount of waste produced (such as undesired isotopes)

The method of the present invention allows for existing and readily available irradiation infrastructure to be adopted, thereby allowing relative quick and cost effective implementation of this method for the generation of actinium isotopes that find widespread applicability the medical field. Because irradiation infrastructure such as a moderated material test reactor can irradiate large volumes, large quantities can be produced. The relatively long half-life of $^{225}$AC of 10 days allows for distribution worldwide without losing much effectiveness, which enables centralized production. This leads to significant economic benefit compared to de-centralized production in multiple machines, using alternative $^{225}$AC generation technologies.

In another aspect of the invention, it was found that when irradiating $^{226}$Ra in a thermal neutron absorption shield, it was possible to separate radium (i.e. all radium isotopes in the target) from other elements in the target within days after irradiation, to eliminate unwanted impurities present in the target or unwanted impurities generated by decay. The period between end of irradiation and first purification should be at least sufficient for the $^{227}$Ra (half-life 42.2 minutes) to decay. Especially $^{227}$AC is an unwanted isotope with a 21.8 year half-life, which should be avoided to be introduced in patients and the environment, and could still be present in the irradiated material in unacceptable quantities, even though its generation was largely avoided by adopting a thermal neutron absorption shield in the method of the invention.

The workup (i.e. the isolation of the desired isotope) can be performed in various ways. In one embodiment by the chemical extraction (or elution) of actinium isotopes from the irradiated $^{226}$Ra to remove actinium (both $^{227}$AC and $^{225}$Ac). With the separation being done several hours-several days after irradiation, adequate quantities of $^{225}$Ra remain to generate new $^{225}$AC in sufficient quantities, and in pure form, as all other actinium isotopes that could be detrimental for product quality have been removed prior to production.

In another embodiment, the workup may be performed by the extraction (or elution) of radium isotopes from the irradiated $^{226}$Ra and subsequently allow the $^{225}$Ra in the isolate to decay into $^{225}$AC.

The thermal neutron shielding in the method of the invention can be established by encompassing the Radium-226 starting material in a (closed) thermal neutron shield. The thermal neutron shield is made of materials having a high thermal neutron cross section. The thermal neutron shield materials are preferably selected from the group of elements with high thermal neutron absorption cross-sections consisting of boron, cadmium, gadolinium, hafnium and mixtures thereof. There is a preference for a gadolinium shield.

The starting $^{226}$Ra material can be provided in the desired chemical form (as a metal, oxide, salt or mixture thereof). The starting material may also be provided as a powder, and/or in combination with other elements such as Al. The starting materials may be sintered and/or pelletized. The starting material is placed in a container, preferably forming a closed containment, for example a closed ampoule, which can be made of metallic, quartz or ceramic material, and can be closed to form a containment.

The ampoule is placed in a preferably cylindrical body consisting of a material with a high thermal neutron absorption cross-section (such as the preferred gadolinium) and with a low absorption cross-section for high energy neutrons. The thermal neutron shield can be considered to form a closed containment as well. Additionally or alternatively, the target material in the ampoule may be mixed with thermal neutron absorber materials. This configuration is placed in a second containment, generally a metallic cylindrical body closed with a (welded) end-cap. The containment is cooled at the outside by the reactor coolant. In between the shield and the outer containment, a low density high thermal conductivity filler can be added in case needed, to transport heat generated in all materials and components to the coolant without high thermal gradients, to avoid overheating and reduce thermal gradients and thereby thermal stresses, melting, decomposition in the various materials and components.

The low energy (thermal) neutron flux from the material test reactor is absorbed by the thermal shield material, hence low energy (thermal) neutrons are almost absent within the shield cavity. High energy (fast) neutron (typically about 0.1 MeV, preferably 5 MeV to about 20 MeV) pass through relatively undisturbed. Therefore in this configuration a specific fast neutron spectrum is created within the neutron shield. For $^{226}$Ra containing material in the shield, the $^{226}$Ra(n,2n) reaction takes place in the material test reactor fast flux (which is largely undisturbed by the shield), but thermal neutron activation reactions are avoided, as thermal neutrons are effectively absorbed by the shield.

The invention can be illustrated in more detail as follows (FIG. 1):

The radium starting material (5), which can be in a variety of chemical forms such as metal, oxide, carbonate, nitride etc. is provided in a radium starting material containment unit (4). The unit (4) may be an ampoule of radiation resistant light material such as metals, quarts, ceramics. The radium-containing starting materials can be placed in the thermal neutron shield holder (3) which may be closed by an end-cap (2). The thermal neutron shield holder (3) and end-cap (2) can be made from a material with a high thermal cross-section, such as boron, cadmium, gadolinium. A preferred material for the holder and end-cap is gadolinium. Preferably the holder and the end-cap are from the same or substantially the same thermal neutron absorbing material. The thermal neutron shield preferably encloses the radium target material completely, i.e. shields it from thermal neutrons of the reactor. The thermally shielded radium target material can be placed in a containment (7), generally from a metallic material that may have a containment cap (1). The containment and containment cap can be sealingly closed, for instance by welding. The containment and containment cap are preferably from the same or substantially the same material. Between the containment and the thermal shield, a filler material (6) may be provided, typically a light weight material with a good thermal conductivity, for example graphite or aluminium.

FIG. 1 discloses a schematic representation of an example of a containment cylinder that holds the thermal neutron shielded radium target material.

Figure 2:
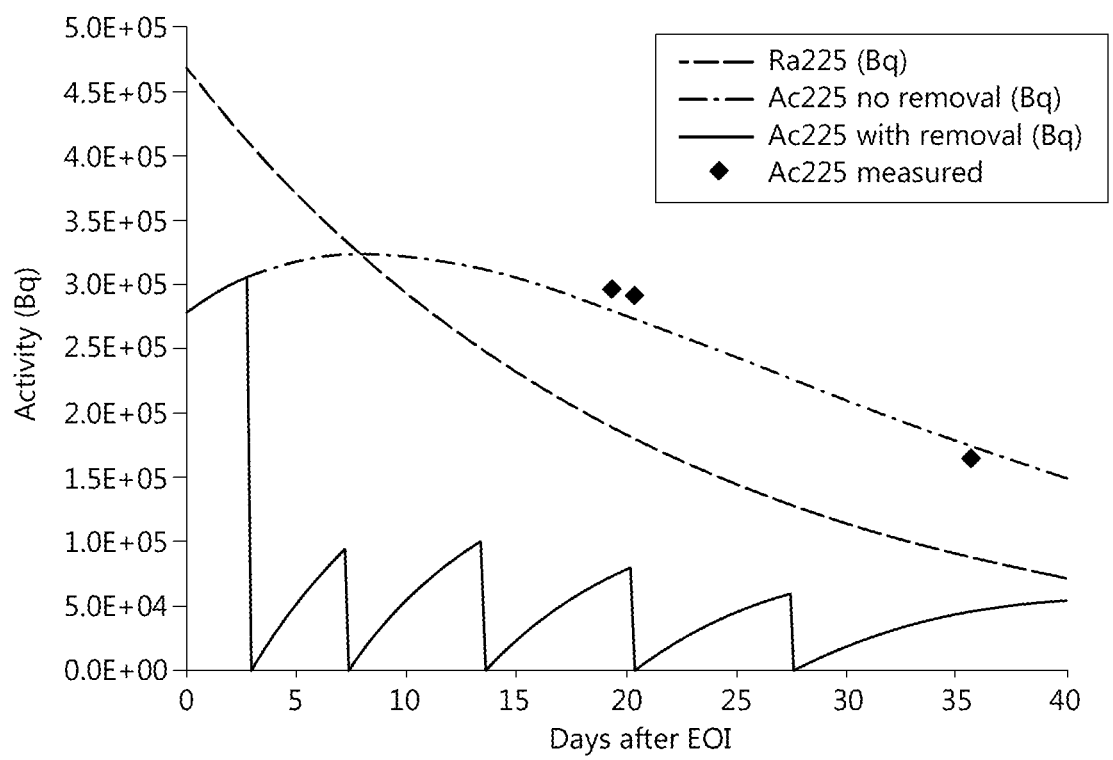
FIG. 2 shows the quantities of $^{225}$AC and $^{225}$Ra over time, during and after irradiation in shielded and unshielded form

FIG. 2 shows the quantities of $^{226}$AC and $^{225}$Ra over time, during and after irradiation in shielded and unshielded form. The unshielded case is based on an actual irradiation of 0.12 mg $^{226}$Ra in a high flux position in the HFR Petten, the Netherlands. $^{226}$AC content was measured at three different times and are indicated in the graph. From the measurements and supported by calculations the quantity of $^{226}$AC provides the quantity of $^{225}$Ra that is produced at the end of irradiation without a thermal neutron absorbing shield. The $^{225}$Ra production rate will be similar or higher in case a thermal neutron absorbing shield is adopted, as the fast neutrons are not absorbed nor affected by the thermal neutron absorption shield, and the burn-up by thermal neutrons of the $^{225}$Ra generated is eliminated by the thermal neutron absorption shield.

With the $^{225}$Ra quantity known over time based on quantity after irradiation and decay, the process of extraction of $^{225}$AC can be simulated:

After 3 days all actinium is chemically removed, and only Radium isotopes $^{225}$Ra and $^{226}$Ra remain. This actinium can contain unacceptable amounts of the unwanted $^{227}$AC isotope and may be discarded or used for other purposes From that point onward the $^{225}$Ra constantly generates new $^{225}$AC, and no other actinium isotope is formed or present.

The $^{225}$AC generated can be repetitively removed until most of the $^{225}$Ra has decayed.

In the figure a tentative extraction scheme is shown, in which after periods ranging from 5 to 8 days the $^{225}$AC is extracted from the Radium.

It is calculated that all Radium is extracted and purified three days after end of irradiation (i.e. at 31+3 days after start of irradiation). The extracted and purified Radium therefore contains no Actinium anymore at that point in time. The $^{225}$AC subsequently generated is generated by decay from $^{225}$Ra that is present in the purified Radium.

FIG. 2 shows a graph of the achieved activity of the irradiation of $^{226}$Ra both in a thermal neutron shielded and a thermal neutron unshielded form (for comparative purposes). The figure shows that from the 0.12 mg $^{226}$Ra irradiated in this way in a regular thermal neutron material test reactor like the HFR, it can be extrapolated that approximately a total of 6.9 GBq $^{225}$Ac/g $^{226}$Ra can be generated, which corresponds to 860 patient doses in case 8MBq per dose is assumed (based on normal PSMA application of $^{225}$Ac). Multiple extractions of 100s of patient doses can therefore be performed based on 1 gram $^{226}$Ra quantities. Adopting a thermal neutron absorption shield, provides similar or higher quantities, but the activity of unwanted isotopes is significantly reduced, facilitating handling and processing to great extent, and reducing the risk of impurities in the end product by reducing their formation during irradiation. In the method described in US20070092051, and based on theoretical calculations, the potential yield was estimated as 5 mCi (0.185 GBq) of Radium-225 per gram of Radium-226 in a fast neutron reactor. The present invention provides a significantly higher yield (about 40-fold) in a regular material test reactor such as the HFR.

There are other, known ways of producing $^{225}$AC but the key benefit of the claimed method is that existing and readily available irradiation infrastructure can be used, providing significant amounts of $^{225}$AC, while eliminating the formation of unwanted isotopes that complicate post-irradiation handling, processing and purification. The use of the readily available irradiation infrastructure allows relative quick and cost effective implementation. This is important for a medical isotope that is already in high demand and expected to increase in demand significantly in coming years, especially regarding the spectacular results achieved with $^{225}$AC for example adopted in conjunction with PSMA-compounds for the treatment of castrate-resistant prostate cancer, and its expected efficacy for new medical applications.

What is claimed is:

1. A method for the manufacture of Actinium-225 containing material from a Radium-226 containing material, comprising:
    (a) subjecting a starting material containing Radium-226 to a neutron irradiation from a nuclear reactor to convert the Radium-226 into Radium-225 to provide a converted material containing Radium-225, wherein:
        (i) the subjecting to the neutron irradiation of the starting material containing the Radium-226 is performed in a moderated nuclear reactor that generates a neutron flux containing fast and thermal neutrons;
        (ii) the starting material containing the Radium-226 is shielded with a thermal neutron absorption shield from thermal neutrons having a neutron energy from 20 eV to 1000 eV during said subjecting to the neutron irradiation in the moderated nuclear reactor;
    (b) allowing a portion of the Radium-225 in the converted material to decay into Actinium-225; and
    (c) then, isolating the Actinium-225 from the rest of the converted material containing the Radium-225.

2. The method according to claim 1, further comprising isolating radium isotopes from the Radium-225 containing material.

3. The method according to claim 1, wherein the moderated nuclear reactor is a moderated material test reactor.

4. The method according to claim 1, wherein the moderated nuclear reactor is a moderated high flux reactor.

5. The method according to claim 1, wherein the thermal neutron absorption shield comprises a material selected from the group consisting of boron, cadmium, gadolinium, hafnium and materials containing these elements and mixtures thereof.

6. The method according to claim 1, wherein the thermal neutron absorption shield comprises gadolinium.

7. The method according to claim 1, wherein during the subjecting to the neutron irradiation, the starting material containing the Radium-226 is irradiated only by the fast neutrons from the moderated nuclear reactor that have an energy from 0.1 MeV to 20 MeV.

8. The method according to claim 7, wherein during the subjecting to the neutron irradiation, the starting material containing the Radium-226 is irradiated only by the fast neutrons from the moderated nuclear reactor that have an energy from 5 MeV to 20 MeV.

9. The method according to claim 1, wherein the starting material is provided as a metal, as an oxide, as a salt, or a mixture thereof.

10. A method for the manufacture of an Actinium-225 containing material, comprising:
    (A) subjecting a Radium-226 containing starting material to a neutron irradiation to produce a converted material by converting Radium-226 of the Radium-226 containing starting material into Radium-225 in the converted material, wherein
        (i) the subjecting to the neutron irradiation of the Radium-226 containing starting material is performed in a moderated nuclear reactor; and
        (ii) during the subjecting to the neutron irradiation, the Radium-226 containing starting material is shielded from thermal neutrons having a neutron energy from 20 eV to 1000 eV generated in the reactor with a thermal neutron absorption shield;
    (B) allowing the converted material to decay into an Actinium-225 containing material; and
    (C) removing the Actinium-225 containing material from the reactor.

11. The method according to claim 10, wherein the converted material contains multiple radium isotopes, wherein the method further comprises isolating from the converted material radium isotopes other than Radium-225 prior to said allowing.

12. The method according to claim 9, wherein the starting material is provided as a salt, wherein the salt is halide, nitrate, carbonate or a mixture thereof.

13. The method according to claim 10, wherein during the subjecting to the neutron irradiation, the starting material containing the Radium-226 is irradiated only by fast neutrons from the moderated nuclear reactor that have an energy from 0.1 MeV to 20 MeV.

14. The method according to claim 13, wherein during the subjecting to the neutron irradiation, the starting material containing the Radium-226 is irradiated only by fast neutrons from the moderated nuclear reactor that have an energy from 5 MeV to 20 MeV.

* * * * *